May 10, 1966 W. K. PRIESE 3,250,511
DIAPHRAGM VALVE WITH LIMITED COMPRESSION MEANS
Filed July 2, 1963
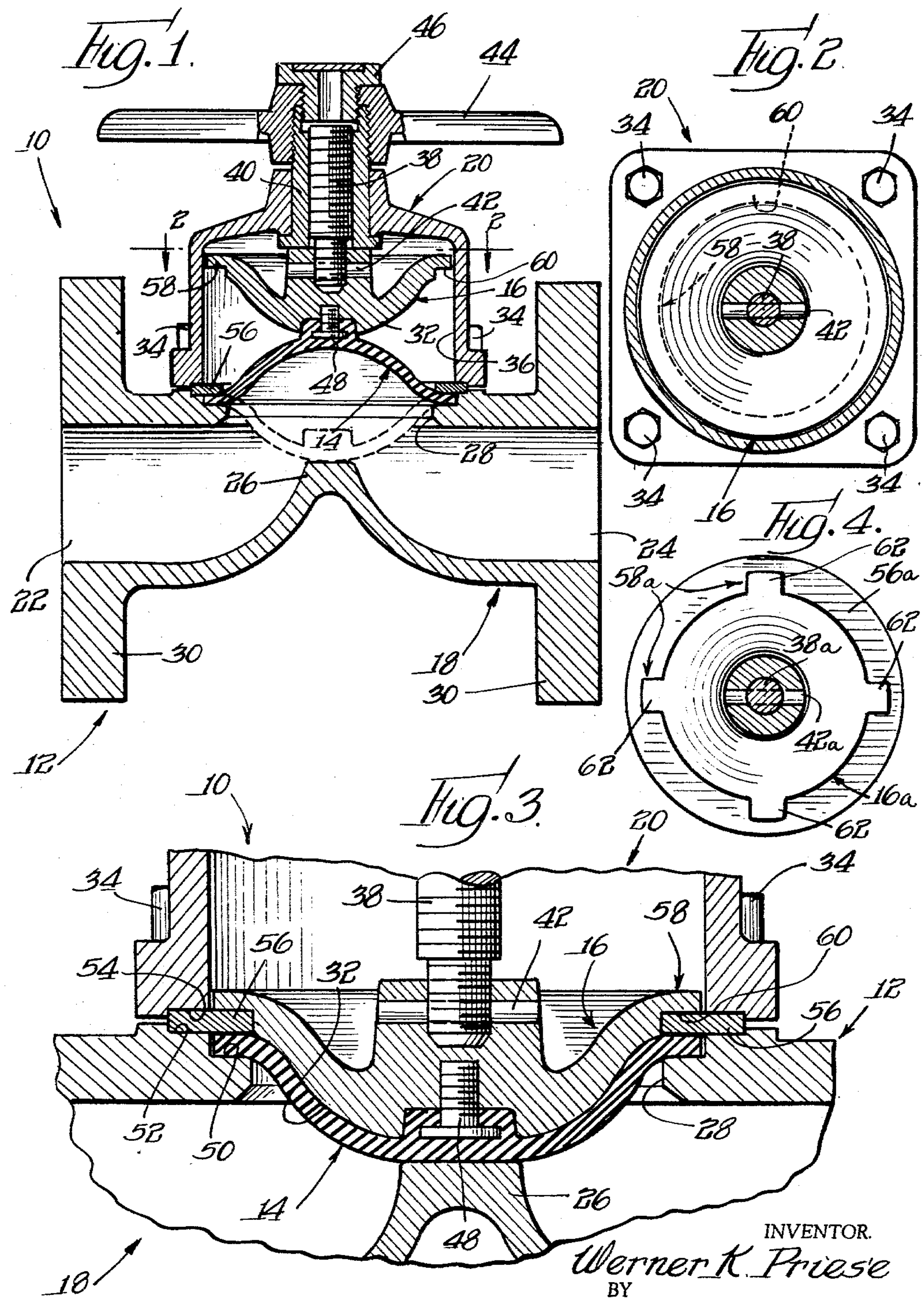
INVENTOR.
Werner K. Priese
BY
Olson, Trexler, Wolters & Bushnell
Attys.

United States Patent Office 3,250,511

Patented May 10, 1966

3,250,511

DIAPHRAGM VALVE WITH LIMITED COMPRESSION MEANS

Werner K. Priese, Carpentersville, Ill., assignor to Hills-McCanna Company, Carpentersville, Ill., a corporation of Illinois Filed July 2, 1963, Ser. No. 292,255
8 Claims. (Cl. 251—331)

This invention relates generally to flow regulating devices and more particularly to industrial valves of the type wherein the flow of liquid is regulated by selectively positioning a flexible diaphragm relative to a stationary weir.

While diaphragm valves display desirable flow characteristics and are susceptible of economic manufacture, they possess a basic fault in that they are capable of being overclosed. Because diaphragm valves are customarily operated by means of a handwheel arrangement of the non-rising stem type, the closed condition of the valve can only be determined by tactily sensing the resistance to additional turning of the handwheel. Overzealous individuals and those of bullish strength habitually overclose such valves and thereby apply excessive compressive force to the valve diaphragm. Even average individuals overclose diaphragm valves with all too frequent regularity. The excessive compression of the valve diaphragm which results from overclosing substantially reduces the life expectancy of the diaphragm and thereby necessitates frequent disassembly of the valve for replacement of the diaphragm.

Therefore, a general object of the present invention is to provide a new and improved diaphragm valve.

Another object of the invention is to provide a diaphragm valve that is arranged to prolong the useful life of its component diaphragm.

Still another object of the invention is to provide a diaphragm valve arrangement that positively limits the amount which the diaphragm can be compressed.

Yet another object of the invention is to provide a diaphragm valve arrangement in which the compression of the component diaphragm is limited to an amount that is compatible with the resistance of the diaphragm material to taking compression set.

A further object of the invention is to provide a diaphragm valve arrangemnt which incorporates a foolproof stop for the valve actuator.

These and other objects and features of the invention will become more apparent from a consideration of the following descriptions.

A diaphragm valve arrangement in accord with the invention includes a stationary weir, a diaphragm actuator mounted for movement in a path toward and away from the weir, and a valve housing surrounding the weir and the actuator. In specific compliance with the invention, the diaphragm actuator includes distally disposed abutment means; and the valve housing incorporates means projecting radially into the path of these abutment means for arresting movement of the actuator toward the weir. A valve diaphragm of resilient material which is susceptible to taking a permanent reduction in dimension upon being severely compressed is mounted in the valve housing across the path of the actuator to be flexed toward the weir by movement of the actuator; and the cooperation between the abutment means and the radially projecting means serves to limit the compression of the diaphragm between the actuator and the weir.

The invention, both to its structure and mode of operation, will be better understood by reference to the following disclosure and drawing forming a part thereof wherein:

FIG. 1 is a sectional, side elevational view of a diaphragm valve arrangement constructed in compliance with the invention, the valve opening condition of the diaphragm being shown in solid outline and the valve closing condition thereof being indicated in broken outline;

FIG. 2 is a plan view taken substantially through the section 2—2 of FIG. 1 to show the abutment means on the diaphragm actuator as an endless shoulder;

FIG. 3 is an enlarged, elevational view similar to the showing of FIG. 1 but illustrating the valve closing condition of the diaphragm and the stopped condition of the actuator in greater detail; and FIG. 4 is a sectional view similar to the showing of FIG. 2 but illustrating a modified embodiment of the invention wherein the diaphragm actuator incorporates distally disposed abutment means taking the form of arcuately spaced ears.

Referring now in detail to the drawing, specifically to FIG. 1, a diaphragm valve arrangement indicated generally by the numeral 10 is seen to include a valve housing 12 which surrounds a valve diaphragm 14 and a compressor element or diaphragm actuator 16. The valve housing 12 includes a valve body 18 and a valve bonnet 20, the valve body 18 defining an inlet passageway 22, an outlet passageway 24, a stationary weir 26 and a work opening 28 aligned with the weir 26 generally transverse the path of flow between the passageways 22 and 24. As shown, the weir 26 forms an integral part of the valve body 18 and projects upwardly across a centerline between the aligned passageways 22 and 24. In order to connect the valve body 18 in a fluid transfer system, end flanges 30 are arranged to radiate from the passageways 22 and 24 for receiving correspondingly flanged conduits in bolted connection. Alternatively, the inside walls of the valve body 18 may be threaded adjacent the passageways 22 and 24 for receiving cooperatively threaded pipe members.

The work opening 28 serves to permit the diaphragm 14 access to the weir 26 for regulating and terminating flow between the passageways 22 and 24; and the opening 28 may take a circular shape, or it may take a generally rectangular shape. Since the actuator 16 is provided for flexing the diaphragm 14 between the open and closed conditions of the valve arrangement, the actuator 16 is fashioned with a downwardly deflected working surface 32 which is provided with a shape or outline which cooperates with the shape of the opening 28. When the opening 28 is circular, the working surface of the actuator is substantially hemispherical whereas, when the opening 28 is generally rectangular, the working surface of the actuator is convexly ellipsoidal.

The valve bonnet 20 is removably secured to the valve body 18 by means of cap screws 34 or other suitable fasteners, the bonnet 20 being mounted to the valve body 18 in covering relationship relative to the work opening 28. Furthermore, the bonnet 20 defines internally a chamber 36 that accommodates the movements of the diaphragm actuator 16 which result in the directed activity of the diaphragm 14. The actuator 16 is mounted in the bonnet 20 for movement in a path toward and away from the weir 26 by means of a threaded operating stem 38. A cooperatively threaded bushing 40 receives the stem 38 to journal the stem in the upper end of the bonnet 20. A crosspin 42 connects the stem 38 to the actuator 16, and a handwheel 44 is secured to the bushing 40 in a threaded connection for rotating the bushing whereby to translate the stem 38 and thereby the actuator 16. A handwheel retainer 46 is advantageously employed in holding the parts in place.

The connection between diaphragm 14 and actuator 16 is achieved by means of a stud 48, stud 48 including a shank which is threaded to enter a cooperatively threaded bore in the actuator 16, stud 48 further including a radially extending flange or head which is embedded in the material of the diaphragm 14. Since the diaphragm 14 is fabricated from a resilient material such as a suitably compounded rubber composition, the body of the diaphragm may be molded and vulcanized about the head of stud 48 for permanent attachment thereto. Moreover, the elastomeric material from which the diaphragm 14 is fabricated is characteristically subject to taking a permanent reduction in dimension upon being severely compressed, this permanent reduction in dimension being customarily referred to as "compression set"; and while the valve arrangement 10 most frequently incorporates a plain elastomeric diaphragm, the susceptibility of the diaphragm material to taking a compression set exists whether the diaphragm incorporates an internal, fabric reinforcement or a surface protective layer of some flexible, chemically inert material such as the various fluorocarbon polymers.

In compliance with the invention, the diaphragm valve arrangement 10 is arranged to limit or control the amount of compression which the diaphragm 14 experiences in use of the valve arrangement; and this limitation or control of the compression of the diaphragm has been found to extend the use-life of the diaphragm in a substantial manner. Advantageously, the amount of compression which is permitted the diaphragm in the valve arrangement 10 is related to the compression set characteristics of the elastomeric material for which the diaphragm is fabricated.

Turning to FIG. 3, the valve arrangement 10 is seen to be constructed so as to provide a stop for the movement of the actuator 16 toward the weir 26. Specifically, the valve body 18 is seen to be fashioned with a continuous recess 50 surrounding the work opening 28 to define a seat for the marginal portions of the valve diaphragm 14. The valve body 18 is also fashioned with a continuous recess 52 which surrounds the recess 50 in stepped relationship therewith. Cooperatively, the valve bonnet 20 is provided with a continuous recess 54 which is alignable with the recess 52 to define therewith a seat for a retainer ring 56. The retainer ring 56 includes an outer margin portion which is disposed in the seat defined by the cooperating recesses 52 and 54 whereby the retainer ring may be clamped between the valve body 18 and the valve bonnet 20 in fixing the retainer ring in position. The retainer ring 56 additionally includes an inner marginal portion overlying the recess 50 that defines the seat for the marginal portions of the diaphragm 14. By appropriately selecting the thickness dimension the marginal portions of the diaphragm 14 relative to the height of the recess 50, the amount of compression to which the marginal portions of the diaphragm are exposed may be controlled. When this permissive compression of the marginal portions of the diaphragm is restricted in compliance with the invention, the so-claled "bolt-load decay" of the diaphragm is controlled; and the sealing efficiency of the marginal edge portions of the diaphragm is both increased and extended.

Distally, the diaphragm actuator 16 is provided with abutment means 58; and it is to be realized that the inner marginal portion of the retainer ring 56 projects radially into the path of movement of the abutment means 58. The surface of the abutment means 58 which is adapted to contact the retainer ring 56 is spaced from the working surface 32 of the actuator 16 in stepped relationship therewith, the distance of this stepped separation being selected to correspond to the thickness of the retainer ring 56. Thus, the working surface 32 of the actuator 16 cooperates with the undersurface of the retainer ring 56 to establish substantially continuous contact with the upper surface of the diaphragm 14 in the closed condition of the valve arrangement. Accordingly, excessive local stressing of the diaphragm adjacent its clamped marginal portions is avoided.

Engagement between the abutment means 58 and the retainer ring 56 defines a downstop for the actuator 16, and the position of this downstop relative to the upper surface of weir 26 is arranged to define the maximum compression of the center of diaphragm 14. The retainer ring 56 thus establishes a positive stop for the actuator 16 which protects the diaphragm 14 in all instances short of fracture of either the abutment means 58 or the retainer ring 56; and because the retainer ring 56 is enclosed within the valve housing 12, the operative effectiveness of the retainer ring cannot be tampered with or nullified unless, of course, the valve is disassembled and the retainer ring removed. Furthermore, the resultant control of the compression of diaphragm 14 prevents overcompression of the diaphragm and prolongs its use-life. In compliance with the invention, the percentage compression to which the diaphragm 14 is limited is substantially no greater than one-half the compression set test value of the elastomeric material from which the diaphragm is fabricated.

In one useful embodiment of the invention wherein the compression of the valve diaphragm at the weir and at the marginal portions of the diaphragm was held to 20% of the corresponding thickness of the diaphragm, an elastomeric material having a compression set test value of 15–20% as determined by the American Society for Testing Materials procedure D–395 has been found to be eminently suitable. An elastomeric material having a test value of 25% has been found to be acceptable; elastomers having a test value of 30% have been found to be of marginal utility; and elastomeric compositions having test values over 40% have been found to be unsatisfactory in this embodiment. Similar relationships exist for valve arrangements subjecting the component diaphragm to greater and lesser compressions.

Turning to a consideration of FIG. 2, the abutment means 58 structurally comprises an endless shoulder 60. While such an arrangement is highly useful, modified structural configurations of the abutment means may also be employed. For example, a modified embodiment of the invention is illustrated in FIG. 4 wherein like numerals have been used to designate like parts, the suffix letter "*a*" being employed to distinguish those elements associated with the embodiment of FIG. 4. There, a diaphragm actuator **16*a* is provided with abutment means 58*a* that comprise four arcuately spaced ears 62. The ears 62 are arranged to cooperate with a retainer ring 56*a* in a manner similar to the cooperation between retainer ring 56 and the endless shoulder 60**.

The manner in which the present invention may be practiced and the purposes to which it may be put are evident from the foregoing descriptions.

The specific examples herein shown and described are to be considered as being primarily illustrative. Various changes beyond those described will, no doubt, occur to those skilled in the art; and such changes are to be understood as forming a part of this invention insofar as they fall within the spirit and scope of the appended claims.

The invention is claimed as follows:

1. In a valve arrangement, the combination comprising: a weir; a diaphragm actuator mounted for movement in a path toward and away from said weir and including distally disposed abutment means; valve housing means surrounding said weir and said actuator, said housing means including a valve body and a valve bonnet defining therebetween a continuous recess opening radially toward the path of movement of said actuator, said housing means further including a planar ring member clamped in said recess between said body and said bonnet and having a portion rigidly projecting radially into the path of movement of said abutment means whereby to define a substantially inflexible stop for said actuator; and a valve diaphragm of resilient material which is susceptible to taking a permanent reduction in dimension upon being severely compressed, said diaphragm being mounted in said housing means across the path of said actuator to be flexed toward said weir by the movement of said actuator, the stop defined by said radially projecting portion acting positively to arrest movement of said actuator toward said weir whereby to limit the compression of said diaphragm between said actuator and said weir.

2. In a valve arrangement, the combination comprising: a weir; a diaphragm actuator mounted for movement in a path toward and away from said weir and including a working surface adapted to contact a valve diaphragm and abutment means extending radially beyond the edge of said working surface and spaced axially therefrom a predetermined distance in stepped relationship therewith; valve housing means surrounding said weir and said actuator, said housing means including a valve body and a valve bonnet defining therebetween a continuous recess opening radially toward the path of movement of said actuator, said housing means further including a planar ring member clamped in said recess between said body and said bonnet and having a portion rigidly projecting radially into the path of movement of said abutment means whereby to define a substantially inflexible stop for said actuator, said ring member having a thickness corresponding to said predetermined distance whereby the radially projecting portion of said ring member cooperates with the stepped relationship between said abutment means and said working surface to establish substantially continuous contact of said ring member and said working surface with a cooperating valve diaphragm in the closed condition of said valve arrangement; and a valve diaphragm of resilient material which is susceptible to taking a permanent reduction in dimension upon being severely compressed, said diaphragm being mounted in said housing means across the path of movement of said actuator to be flexed toward said weir by the movement of said actuator, said radially projecting portion being positioned to engage said abutment means and positively arrest movement of said actuator toward said weir whereby to limit the compression of said diaphragm between said actuator and said weir.

3. In a valve arrangement, the combination comprising: a weir; a diaphragm actuator mounted for movement in a path toward and away from said weir and including distally disposed abutment means; valve housing means surrounding said actuator, said housing means including a valve body and a valve bonnet defining therebetween a continuous recess opening radially toward the path of movement of said actuator, said housing means further including a planar ring member clamped in said recess between said body and said bonnet and having a portion rigidly projecting radially into the path of movement of said abutment means whereby to define a substantially inflexible stop for said actuator, said valve body having a continuous groove aligned beneath said ring member for receiving the edge portion of a valve diaphragm; and a valve diaphragm of elastomeric material which is susceptible to taking a permanent reduction in dimension upon being severely compressed, said diaphragm being mounted in said groove clamped between said body and said ring member across the path of said actuator to be flexed toward said weir by the movement of said actuator, said radially projecting portion being positioned to engage said abutment means and positively arrest movement of said actuator toward said weir whereby to limit the compression of said diaphragm between said actuator and said weir.

4. In a diaphragm valve arrangement, the combination comprising: a valve body defining inlet and outlet passageways and having a weir disposed intermediate said passageways, said valve body further having an opening alinged with said weir transverse the path of flow between said passageways and a first continuous recess surrounding said opening; a valve bonnet removably secured to said body in covering relationship with said opening, said valve bonnet having a second continuous recess alignable with said first recess for cooperating therewith in defining a seat for a retainer ring; a retainer ring in said planar retainer ring seat clamped between said body and said bonnet, a portion of said ring rigidly extending radially inwardly from the walls of said valve bonnet to define a substantially inflexible stop for a diaphragm actuator; a valve diaphragm of resilient material having marginal portions clamped between said valve body and said retainer ring to situate said diaphragm in spanning relationship with said opening; and a diaphragm actuator mounted in said bonnet for movement toward said weir and engageable with said diaphragm for compressing said diaphragm against said weir in closing off the flow of fluid between said passageways, said actuator having distally disposed abutment means engageable with said retainer ring for positively arresting movement of said actuator toward said weir whereby to limit the compression of said diaphragm between said actuator and said weir.

5. In a diaphragm valve arrangement, the combination comprising: a valve body defining inlet and outlet passageways and having a weir disposed intermediate said passageways, said valve body further having an opening aligned with said weir transverse the path of flow between said passageways, a first continuous recess surrounding said opening to define a seat for the marginal portions of a valve diaphragm, and a second continuous recess surrounding said first recess in stepped relationship therewith; a valve bonnet removably secured to said body in covering relationship with said opening, said valve bonnet having a third continuous recess alignable with said second recess for cooperating therewith in defining a seat for a retainer ring; a retainer ring in said retainer ring seat clamped between said body and said bonnet, a portion of said ring overlying said diaphragm seat and extending radially inwardly from the walls of said bonnet to define a stop for a diaphragm actuator; a valve diaphragm of resilient material having marginal portions disposed in said diaphragm seat and clamped between said valve body and said retainer ring to situate said diaphragm in spanning relationship with said opening; and a diaphragm actuator mounted in said bonnet for movement toward said weir and engageable with said diaphragm for compressing said diaphragm against said weir in closing off the flow of fluid between said passageways, said actuator having distally disposed abutment means engageable with said retainer ring for arresting movement of said actuator towards said weir whereby to limit the compression of said diaphragm between said actuator and said weir.

6. In a diaphragm valve arrangement, the combination comprising: a valve body defining inlet and outlet passageways and having a weir disposed intermediate said passageways, said valve body further having an opening aligned with said weir transverse the path of flow between said passageways and a first continuous recess surrounding said opening; a valve bonnet removably secured to said body in covering relationship with said opening, said valve bonnet having a second continuous recess alignable with said first recess for cooperating therewith in defining a seat for a retainer ring; a retainer ring in said retainer ring seat clamped between said body and said bonnet, a portion of said ring extending radially inwardly from the walls of said valve bonnet to define a stop for a diaphragm actuator; a valve diaphragm of resilient material having marginal portions clamped between said valve body and said retainer ring to situate said diaphragm in spanning relationship with said opening; and a diaphragm actuator mounted in said bonnet for movement toward said weir and engageable with said diaphragm for compressing said diaphragm against said weir in closing off the flow of fluid between said passageways, said actuator having a working surface adapted to contact said diaphragm and abutment means extending radially beyond the edge of said working surface and spaced therefrom by a distance corresponding to the thickness of said retainer ring in stepped relationship with said working surface, said abutment means being engageable with said retainer ring for arresting movement of said actuator toward said weir whereby to limit the compression of said diaphragm between said actuator and said weir to an amount defined by the cooperation between the location of the top surface of said weir and the stopped position of said actuator.

7. In a diaphragm valve arrangement, the combination comprising: a valve body defining inlet and outlet passageways and having a weir disposed intermediate said passageways, said valve body further having an opening aligned with said weir transverse the path of flow between said passageways and a first continuous recess surrounding said openings; a valve bonnet removably secured to said body in covering relationship with said opening, said valve bonnet having a second continuous recess alignable with said first recess for cooperating therewith in defining a seat for a retainer ring; a retainer ring in said retainer ring seat clamped between said body and said bonnet, a portion of said ring extending radially inwardly from the walls of said valve bonnet to define a stop for a diaphragm actuator; a valve diaphragm of elastomeric material having marginal portions clamped between said valve body and said retainer ring to situate said diaphragm in spanning relationship with said opening; and a diaphragm actuator mounted in said bonnet for movement toward said weir and engageable with said diaphragm for compressing said diaphragm against said weir in closing off the flow of fluid between said passageways, said actuator having distally disposed abutment means engageable with said retainer ring for arresting movement of said actuator toward said weir whereby to limit the compression of said diaphragm between said actuator and said weir to an amount defined by the cooperation between the location of the top surface of said weir and the stopped position of said actuator, the percentage compression to which said diaphragm is limited being substantially no greater than one-half the compression set test value of said elastomeric material.

8. In a diaphragm valve arrangement, the combination comprising: a valve body defining inlet and outlet passageways and having a weir disposed intermediate said passageways, said valve body further having an opening aligned with said weir transverse the path of flow between said passageways, a first continuous recess surrounding said opening to define a seat for the marginal portions of a valve diaphragm, and a second continuous recess surrounding said first recess in stepped relationship therewith; a valve bonnet removably secured to said body in covering relationship with said opening, said valve bonnet having a third continuous recess alignable with said second recess for cooperating therewith in defining a seat for a retainer ring; a retainer ring in said retainer ring seat clamped between said body and said bonnet, a portion of said ring overlying said diaphragm seat and extending radially inwardly from the walls of said valve bonnet to define a stop for a diaphragm actuator; a valve diaphragm of elastomeric material having marginal portions disposed in said diaphragm seat and clamped between said valve body and said retainer ring to situate said diaphragm in spanning relationship with said opening, said retainer ring being spaced from said valve body at said diaphragm seat to limit the compression of said marginal portions, the percentage compression to which said marginal portions are limited being substantially no greater than one-half the compression set test value of said elastomeric material; and a diaphragm actuator mounted in said bonnet for movement toward said weir and engageable with said diaphragm for compressing said diaphragm against said weir in closing off the flow of fluid between said passageways, said actuator having distally disposed abutment means engageable with said retainer ring for arresting movement of said actuator toward said weir whereby to limit the compression of said diaphragm between said actuator and said weir.

References Cited by the Examiner

FOREIGN PATENTS

| | | |
|---|---|---|
| 883,372 | 7/1953 | Germany. |
| 1,117,030 | 2/1956 | France. |

ISADOR WEIL, *Primary Examiner.*

A. COHAN, *Assistant Examiner.*